US009614717B2

(12) United States Patent
Chen

(10) Patent No.: US 9,614,717 B2
(45) Date of Patent: Apr. 4, 2017

(54) METHOD AND SYSTEM FOR TERMINAL ACCESS AND MANAGEMENT IN CLOUD COMPUTING

(75) Inventor: Zhenghua Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 594 days.

(21) Appl. No.: 13/638,592

(22) PCT Filed: Jan. 30, 2011

(86) PCT No.: PCT/CN2011/070827
§ 371 (c)(1),
(2), (4) Date: Sep. 29, 2012

(87) PCT Pub. No.: WO2012/037787
PCT Pub. Date: Mar. 29, 2012

(65) Prior Publication Data
US 2013/0024572 A1 Jan. 24, 2013

(30) Foreign Application Priority Data
Sep. 26, 2010 (CN) .......................... 2010 1 0291986

(51) Int. Cl.
G06F 15/173 (2006.01)
H04L 12/24 (2006.01)
(Continued)

(52) U.S. Cl.
CPC .......... *H04L 41/042* (2013.01); *H04L 41/044* (2013.01); *H04L 41/0654* (2013.01);
(Continued)

(58) Field of Classification Search
CPC . H04L 41/042; H04L 41/044; H04L 41/0654; H04L 41/0668; H04L 41/0695; H04L 41/12; H04L 12/18
(Continued)

(56) References Cited

U.S. PATENT DOCUMENTS 5,117,430 A 5/1992 Berglund
8,537,733 B1 * 9/2013 Panneerselvam . H04W 52/0235
370/311
(Continued)

FOREIGN PATENT DOCUMENTS

CN 1719831 A 1/2006
CN 101207635 A 6/2008
(Continued)

OTHER PUBLICATIONS

Supplementary European Search Report in European application No. 11826314.4, mailed on Jan. 8, 2014.
(Continued)

Primary Examiner — David Lazaro
Assistant Examiner — Xiang Yu
(74) Attorney, Agent, or Firm — Oppedahl Patent Law Firm LLC

(57) ABSTRACT

The disclosure discloses a method for terminal access and management in cloud computing, including: a terminal with a management and control module accesses a bidirectional data transmission network and acts as a node; the node searches for a first responding control node or agent control node and connects with a network management server via an agent control node connected to the found control node or via the found agent control node; a management and control module of a node at each level collects running information of the terminal and reports the running information level by level, and a nearest super-ordinate node performs a management operation. The disclosure further discloses a system for terminal access and management in cloud computing. With the method and the system, the problems that the system status has to be pre-estimated and a proper node has to be selected when new equipment access an original system can be solved, and after the access, a super-ordinate node can perform actively a control operation on the topological structure.

8 Claims, 5 Drawing Sheets

(51) Int. Cl.
  *H04L 12/26* (2006.01)
  *H04L 29/08* (2006.01)
  *G06F 9/50* (2006.01)

(52) U.S. Cl.
  CPC ...... *H04L 41/0668* (2013.01); *H04L 41/0695* (2013.01); *G06F 9/5072* (2013.01); *H04L 43/0817* (2013.01); *H04L 67/10* (2013.01)

(58) Field of Classification Search
  USPC .......................................................... 709/225
  See application file for complete search history.

(56) References Cited

U.S. PATENT DOCUMENTS

| | | | | |
|---|---|---|---|---|
| 2004/0117476 A1* | 6/2004 | Steele | ................... | G06F 9/5083 709/224 |
| 2004/0249919 A1* | 12/2004 | Mattheis | ....................... | 709/223 |
| 2008/0155552 A1 | 6/2008 | Kim | | |
| 2011/0131645 A1* | 6/2011 | Johnson | .............. | G06F 11/0709 726/12 |
| 2011/0188378 A1 | 8/2011 | Collins | | |

FOREIGN PATENT DOCUMENTS

| | | |
|---|---|---|
| CN | 101605128 A | 12/2009 |
| CN | 101692181 A | 4/2010 |
| CN | 101741449 A | 6/2010 |
| CN | 101820387 A | 9/2010 |
| CN | 101958805 A | 1/2011 |
| WO | 2008110202 A1 | 9/2008 |

OTHER PUBLICATIONS

International Search Report in international application No. PCT/CN2011/070827, mailed on Jun. 30, 2011.
English Translation of the Written Opinion of the International Search Authority in international application No. PCT/CN2011/070827, mailed on Jun. 30, 2011.

* cited by examiner

METHOD AND SYSTEM FOR TERMINAL ACCESS AND MANAGEMENT IN CLOUD COMPUTING

TECHNICAL FIELD

The disclosure relates to network architecture and management in cloud computing, in particular to a method and a system for terminal access and management in cloud computing.

BACKGROUND

Cloud computing is an outcome of development and integration of traditional computer and network techniques such as Grid Computing, Distributed Computing, Parallel Computing, Utility Computing, Network Storage Technologies, Virtualization, Load Balance, and the like. It aims to integrate multiple relatively low-cost computing entities into a sophisticated system with a powerful computing capability, and distribute the powerful computing capability to each computing entity, that is, to each node. The basic concept of cloud computing actually stems from a distributed computing technique of the past, where both have essentially similar system architecture and adopt essentially similar system management method, both using a distributed equipment management mode. However, with the fast development of distributed computing and cloud computing, they both raise new requirements on the scale, reliability, general applicability, and expandability of the system. The traditional distributed equipment management mode also shows its drawbacks regarding distributed computing and cloud computing.

FIG. 1 is a diagram of a currently common topological structure of distributed equipment management. As shown in FIG. 1, most traditional equipment management modes adopt a preconfigured tree structure, wherein a level number increases level by level from a controlled node at the bottom level to a control node at the top level. A control node 11 manages a controlled node 12 and sends out a control instruction or collects running information; a control node at the top level provides a system management interface to external, receives a control instruction from a client 13, and distributes the received instruction level by level to complete the process of management.

New equipment is added by modifying a physical topological structure of a traditional distributed system of pieces of equipment when the capacity of the system needs to be expanded. Before the access of the new equipment, it is needed to pre-estimate a system status and select a proper node so as to avoid a performance bottleneck. As the number of equipment increases, difficulty in implementing the solution increases correspondingly with insufficient expandability, rendering the solution unsuitable for use in a large scale system.

As the system runs, when a node is found to be overloaded, what can be done is only to replace physical equipment to increase a processing capability, or modify the topological structure manually, which can not provide a fast solution and thus can not ensure system reliability. Furthermore, the whole system may be in an unsupervised state and can not be recovered automatically when a control node at the top level fails.

SUMMARY

Accordingly, the main objective of the disclosure is to provide a method and a system for terminal access and management in cloud computing, so as to avoid the necessity of pre-estimating a system status and selecting a proper node at the time of access of new equipment; and after the access, a super-ordinate node is capable of actively controlling the topological structure.

To achieve the objective, the technical solution of the disclosure is implemented as follows.

The disclosure discloses a method for terminal access and management in cloud computing, including:

making a terminal with a management and control module access a bidirectional data transmission network and taking the terminal as a node;

searching, by the node, for a first responding control node or agent control node, and connecting, by the node, with a network management server via an agent control node connected to the found control node or via the found agent control node; and collecting, by a management and control module of a node at each level, running information of the terminal, and reporting, by the management and control module of the node at each level, the running information level by level, and performing, by a nearest super-ordinate node, a management operation.

Wherein the management operation may include a load adjustment operation or a transfer management operation; wherein the load adjustment operation is that: a heavily loaded control node selects a least loaded controlled node, promotes the least loaded controlled node to be a control node, and transfers management and control power over a certain proportion of controlled nodes to the promoted node; and the transfer management operation is that: a control node selects a least loaded controlled node, promotes the least loaded controlled node to be a control node, and transfers management and control power over all controlled nodes to the promoted node.

Wherein before searching, by the node, for the first responding control node or agent control node, the method may further include: searching, by a nearest subordinate node, for the first responding control node or agent control node when the nearest super-ordinate node fails.

Wherein the searching, by the node, for a first responding control node or agent control node and connecting with a network management server via an agent control node connected to the found control node or via the found agent control node may include:

searching, by each node, for a control node or agent control node via multicast of a controlled request, establishing, by the each node, a controlled connection with the first responding control node or agent control node when the control node or agent control node is found; then updating, by the each node, level information, and connecting, by the each node, with the network management server via an agent control node connected to the found control node or via the found agent control node; and multicasting an agent application when no control node or agent control node is found, marking a node that multicasts the agent application first as an agent control node, updating level information, registering the agent control node with the network management server, and connecting, by other nodes, with the network management server via the newly registered agent control node.

Wherein the running information may include one or more items in a group consisting of performance data of the node, loads of the node, equipment warning, and warning of an execution failure.

The disclosure further discloses a system for terminal access and management in cloud computing, including a network management server and nodes; wherein the nodes further include an access node, an agent control node, and a control node; wherein the network management server is configured to send a management instruction to the agent control node;

the access node is provided with a management and control module, and is configured to access a bidirectional data transmission network, search for a first responding control node or agent control node, and connect with the network management server via an agent control node connected to the found control node or via the found agent control node; and the nodes are provided with management and control modules, and are further configured to collect running information and report the running information level by level, and are subjected to management operations performed by their respective nearest super-ordinate nodes.

Wherein the management operations performed on the nodes by their respective nearest super-ordinate nodes may include load adjustment operations or transfer management operations; wherein the load adjustment operations performed by the nearest super-ordinate nodes are that: a heavily loaded control node selects a least loaded controlled node, promotes the least loaded controlled node to be a control node, and transfers management and control power over a certain proportion of controlled nodes to the promoted node; and the transfer management operations performed by the nearest super-ordinate nodes are that: a control node selects a least loaded controlled node, promotes the least loaded controlled node to be a control node, and transfers management and control power over all controlled nodes to the promoted node.

Wherein the nodes may be further configured to search for the first responding control node or agent control node when their respective nearest super-ordinate nodes fail.

Wherein the access node searches for the first responding control node or agent control node and connects with the network management server via the agent control node connected to the found control node or via the found agent control node, which may refer to that:

the access node searches for a control node or agent control node via multicast of a controlled request, establishes a controlled connection with the first responding control node or agent control node when the control node or agent control node is found, updates level information, and connects with the network management server via the agent control node connected to the found control node or via the found agent control node; and an agent application is multicast when no control node or agent control node is found, a node that multicasts the agent application first is marked as an agent control node, level information is updated, the agent control node is registered with the network management server, and other nodes are connected with the network management server via the newly registered agent control node.

In the method and the system provided by the disclosure for terminal access and management in cloud computing, a terminal with a management and control module accesses a bidirectional data transmission network and acts as a node; the node searches for a first responding control node or agent control node and connects with a network management server via an agent control node connected to the found control node or via the found agent control node; a management and control module of a node at each level collects running information of the terminal and reports the running information level by level, and a nearest super-ordinate node performs a management operation. On one hand, an access node may search for a control node or agent control node with the best transmission condition to perform the access; moreover, after the access, a nearest super-ordinate node further modifies the topological structure automatically according to running information, avoiding overload of a single node and complicated operations such as assessment of the system status in advance or selection of a proper node; in addition, automatic management of the topological structure by a nearest super-ordinate node also makes the network formed by the nodes independent of a specific management and control platform, so that different pieces of equipment can all access the system as long as they are provided with management and control modules, thereby increasing general applicability of node equipment.

DETAILED DESCRIPTION

Figure 1:
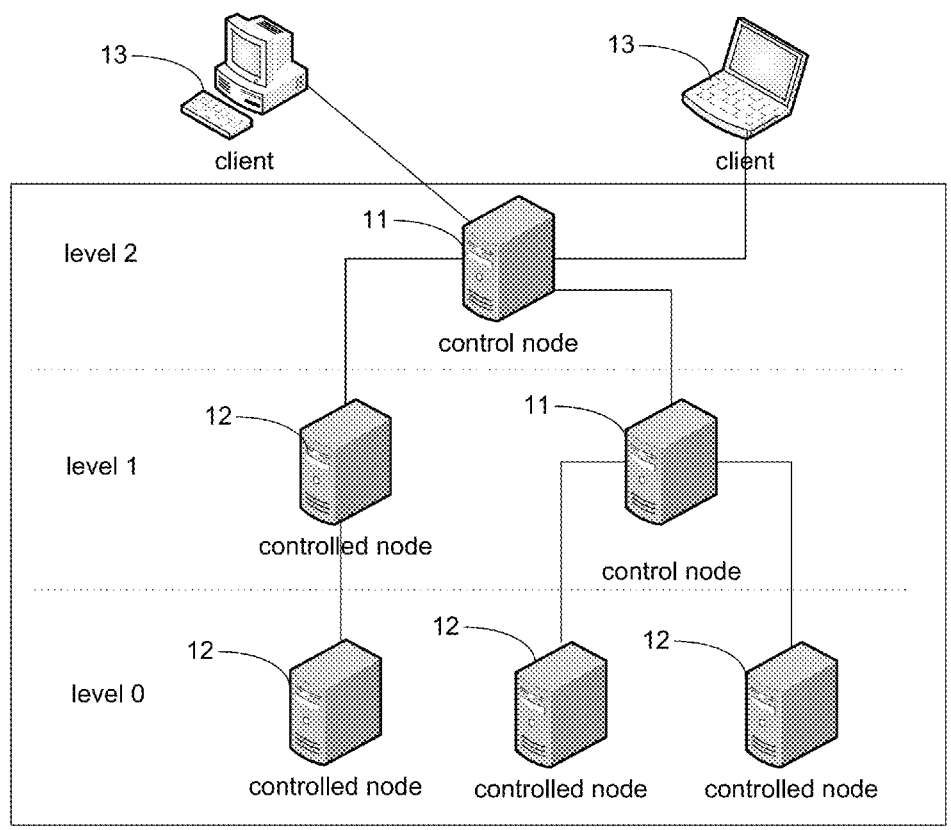
FIG. 1 is a diagram of a currently common topological structure of distributed equipment management.
Figure 2:
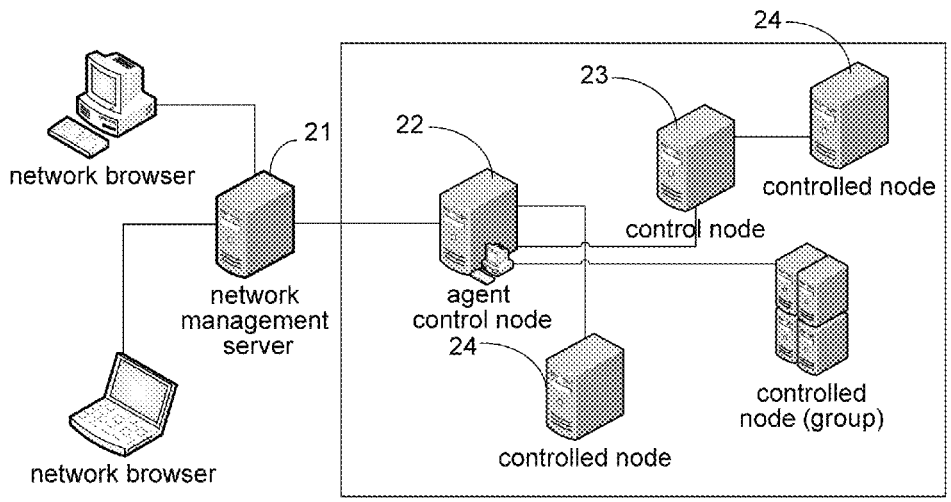
FIG. 2 is a diagram of a topological structure of terminal access and management in cloud computing according to an embodiment of the disclosure.

In order to understand the disclosure better, a topological structure for terminal access and management in cloud computing in the disclosure is introduced first. FIG. 2 is a diagram of a topological structure for terminal access and management in cloud computing according to an embodiment of the disclosure; as shown in FIG. 2, the network architecture includes:

a network management server 21, which is configured to provide a network management mode of Browser/Server structure, in which a manager may access a network management server 21 via a network browser to perform a management operation.

an agent control node 22, which is a control node at the topmost level and is connected with the network management server 21 via a controlled connection, and is in charge of communication with the network management server 21 and reception and execution of a management instruction from the network management server 21; wherein the execution of a management instruction includes: continuing sending down a management instruction and/or performing an operation that needs to be executed by the agent control node itself according to the management instruction.

a control node 23, which is connected with the agent control node 22 via a controlled connection, and is in charge of communication with the agent control node 22 and reception and execution of a management instruction from the agent control node 22; wherein the execution of a management instruction includes: continuing sending down a management instruction and/or performing an operation that needs to be executed by the control node itself according to the management instruction.

a controlled node 24, which is connected with the control node 23 or the agent control node 22 via a controlled connection, and is equipment that needs to be managed in the system, and receives and executes a management instruction from a higher level, and returns a result of the execution or returns warning information of an execution failure.

It is to be noted that all of the agent control node 22, the control node 23, and the controlled node 24 are nodes in the system and each includes a management and control module; the function of the management and control module includes: establishing a data connection, executing a management instruction, collecting performance analysis data, reporting equipment warning information, or reporting warning information of an execution failure, etc; wherein the executing a management instruction includes: continuing sending down a management instruction and/or performing an operation that needs to be executed per se according to the management instruction, wherein the operation that needs to be executed per se includes computing, storing, and the like. The three nodes are different in that, compared with the controlled node 24, the control node 23 further needs to execute a management and control operation, in particular it may send a management instruction to the controlled node 24; and operations that need to be executed by the agent control node 22 and the control node 23 are essentially the same, and the difference is that the agent control node 22 is a node at the topmost level in the system and is connected with the network management server 21. In addition, the controlled node 24 may be single node equipment or an equipment tree; in the equipment tree, a node at the topmost level is in charge of connection with the agent control node 22 or the control node 23. Since the controlled node 24 also needs to send a return message to the network management server 21 via the control node 23 or the agent control node 22, all controlled connections in the system are bidirectional data transmission connections, for example Transmission Control Protocol (TCP), User Datagram Protocol (UDP), etc.

Next, the technical solution of the disclosure is further elaborated with reference to figures and specific embodiments.

Figure 3:
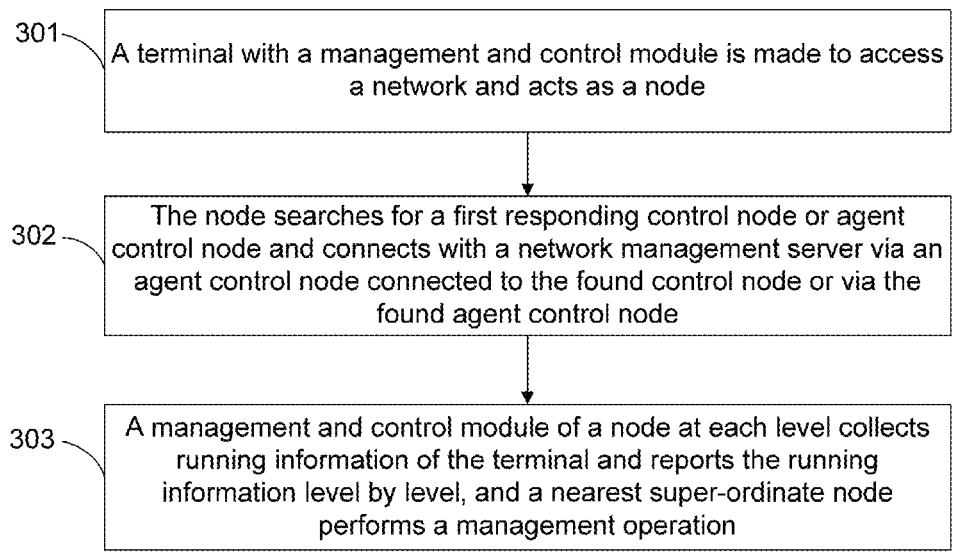
FIG. 3 is a flowchart of a method for terminal access and management in cloud computing according to an embodiment of the disclosure.

FIG. 3 is a flowchart of a method for terminal access and management in cloud computing according to an embodiment of the disclosure; as shown in FIG. 3, the method specifically includes the steps.

Step 301: A terminal with a management and control module is made to access a network and acts as a node.

Specifically, the network is a network supporting bidirectional data transmission. The terminal with a management and control module is a terminal capable of implementing communication and processing an instruction, and becomes a node in the system after accessing the network. In principle, there is no particular requirement on the topological structure when the terminal accesses the network. In view of security and network complexity reduction, it is preferable to construct the network by Virtual Private Network (VPN) technique, which though is not a necessary condition of the disclosure.

Step 302: The node searches for a first responding control node or agent control node, and connects with a network management server via an agent control node connected to the found control node or via the found agent control node.

Specifically, the node first searches for the control node or agent control node by multicasting a controlled request, establishes a controlled connection with the first responding control node or agent control node when finding the control node or agent control node, then updates level information, and connects with the network management server via the agent control node connected to the found control node or via the found agent control node; an agent application is multicast when no control node or agent control node is found; a node that multicasts the agent application first is marked as an agent control node; level information is updated and the agent control node is registered with the network management server; and other nodes connect with the network management server via the newly registered agent control node; in this way, a dynamic topological structure is established and a network loading process is completed.

And Step 303: A management and control module of a node at each level collects running information of the terminal and reports the running information level by level, and a nearest super-ordinate node performs a management operation.

Specifically, the reported running information includes one or more items in a group consisting of performance data of the node, load of the node, equipment warning, and warning of an execution failure. After the establishment of the dynamic topological structure, a nearest super-ordinate node can perform an active management operation on the structure of the system according to real time performance information; wherein the management operation includes: modifying the number of the controlled nodes managed by the nearest super-ordinate node itself so as to transfer loads and achieve load balance, which will be further elaborated with reference to FIG. 5; and transferring management by the nearest super-ordinate node when the nearest super-ordinate node logs off so as to selectively transfer management power to a nearest subordinate node, thus ensuring system stability and efficiency in processing a task, which will be further elaborated with reference to FIG. 6.

Moreover, when a control node or agent control node accidentally fails, its subordinate node executes Step 302 and Step 303 once again to reestablish the topological structure, thus avoiding spread of the failure and increasing system reliability.

Moreover, under special circumstances, the function of the network management server can be expanded to allow registration of multiple agent control nodes and warning information for a network anomaly is generated, when the system is separated into multiple independent topological structures and multiple agent control nodes are generated due to a network failure. A manager performs topological merging via the network management server after recovering the network from the failure, selects an agent control node of the highest level, and requires other agent control nodes to re-execute Step 302 and Step 303. By this time, the system automatically merges into one entirety.

Figure 4:
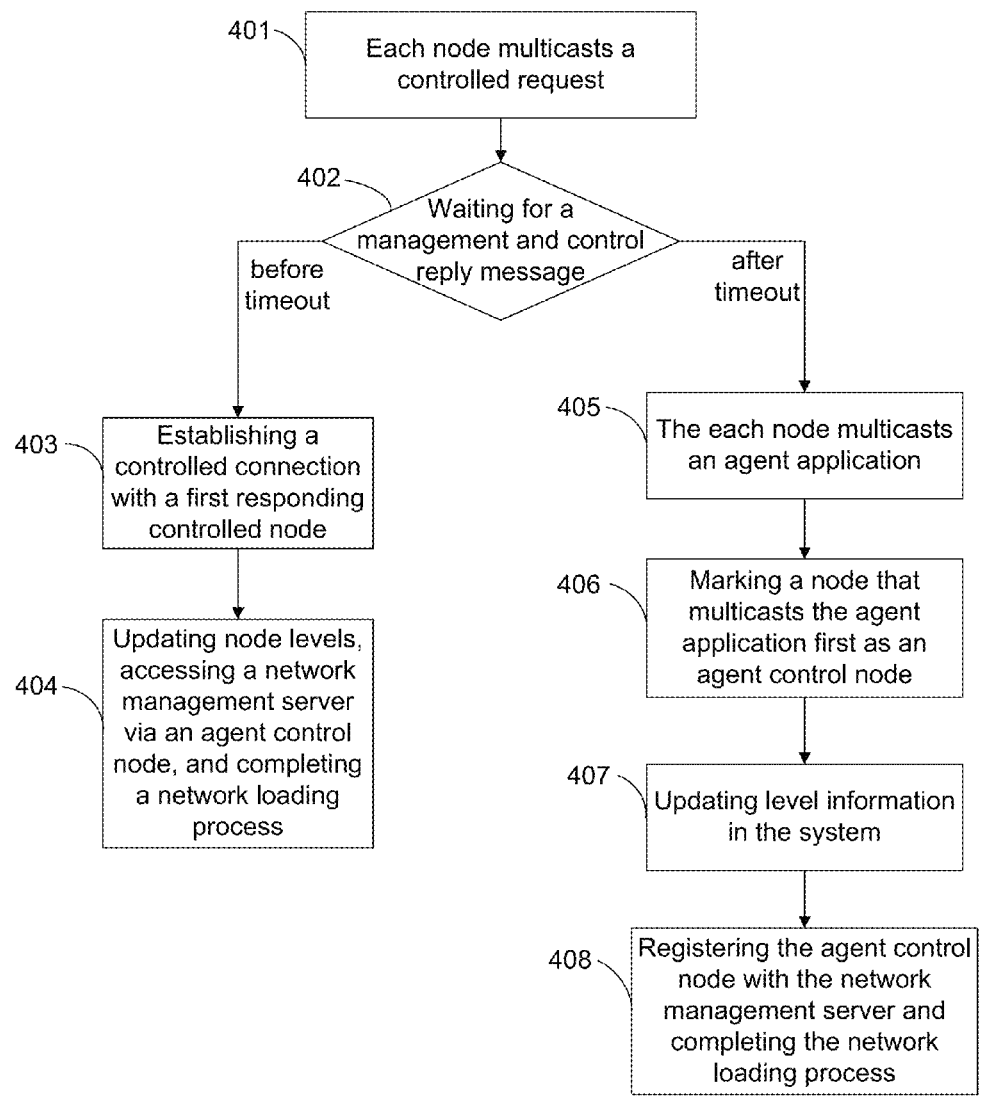
FIG. 4 is a flowchart of a method according to an embodiment of the disclosure, in which a node searches for a first responding control node or agent control node and connects with a network management server via the agent control node.

Moreover, FIG. 4 is a flowchart of a method according to an embodiment of the disclosure, in which a node searches for a first responding control node or agent control node and connects with a network management server via an agent control node; as shown in FIG. 4, the method specifically includes the steps.

Step 401: Each node multicasts a controlled request.

Specifically, a node multicasts a controlled request including the level of the current node, wherein for a newly access node or a restarted node, the initial level is 0; for a node whose nearest super-ordinate node accidentally logs off, the original level remains unchanged. When a control node or agent control node is already provided in the system and has received a controlled request, the control node or agent control node returns a management and control reply message according to the level of the control node or agent control node and the level in the controlled request, which specifically is to compare the levels, for example, when the level of the control node or agent control node is higher than the level in the controlled request, a management and control reply message is returned, otherwise the controlled request is discarded. The management and control reply message includes level information of the control node.

Step 402: The each node waits for the management and control reply message; Step 403 is executed when the management and control reply message is received before timeout; otherwise Step 405 is executed;

specifically, a subsequent management and control reply message is discarded when more than 1 management and control reply message is received; the timeout may be flexibly set according to a status of the network.

Step 403: The each node establishes a controlled connection with a first responding control node;

specifically, the each node establishes a controlled connection with a corresponding control node according to a received management and control reply.

Step 404: The each node updates its node level, accesses the network management server via the agent control node, and completes the network loading process;

specifically, the each node modifies its own level according to the level of the control node and sends down the level modification. For example, when the level of a super-ordinate control node of a node is N, the node modifies its level to N−1, and the level of its nearest subordinate controlled node is modified to N−2, and so on.

Step 405: The each node multicasts an agent application;

specifically, when the management and control reply message is not received, for a newly access node or a restarted node, it means that there is no control node in the current system and a topological structure is yet to be established; for a node whose nearest super-ordinate node accidentally logs off, it means that the agent control node is offline. At this moment, the node goes into an agent control application process and multicasts an agent application including the number of times that the agent application is multicast and level information of the node, wherein the number of times of multicast starts from 1 and increases sequentially; for a newly access node or a restarted node, the initial level is 0; for a node whose nearest super-ordinate node accidentally logs off, the original level remains unchanged. When receiving the agent application, the control node executes the processing performed when the controlled request is received. Thus it can be ensured that a newly access node can find the control node again when the controlled request is multicast and even when a waiting time is set too short.

Step 406: A node that multicasts the agent application first is marked as an agent control node;

specifically, this step includes the following steps:

Step 406a: a prior agent application is received. The node, after multicasting an agent application, enters a waiting timeout process; at this moment, when an agent application from another node is received, a priority determination is made; the greater the number of times of multicast is, the higher the priority is; when the number of times of multicast is the same, the smaller the IP address is, the higher the priority is; when the another node has higher priority, the node quits the agent application and turns to Step 401; otherwise continues with Step 406b;

Step 406b: the node waits for the management and control reply. When the management and control reply is received as the node is in the waiting timeout process, it means that a new control node is generated; at this moment, the node stops the application process and goes to Step 403, otherwise continues with Step 406c; and Step 406c: the number of times of multicast of an agent application is determined, and is increased by 1 when the number does not exceed 3, and then Step 405 is executed; otherwise the node is marked as an agent control node.

By determination of Step 406a to Step 406c, it can be ensured that a node that multicasts an agent application first is marked as an agent control node. Both the duration of the waiting timeout process in Step 406a to Step 406c and the threshold value of the number of times of multicast of an agent application can be flexibly set according to a network status in the system. When the transmission condition of the network is good, the waiting time as well as the threshold value can be set to be relatively small so as to speed up establishment of a dynamic topological structure; when the transmission condition of the network is poor, the waiting time as well as the threshold value can be set to be relatively large so as to ensure successful final loading of the network and reduce the risk of overload of the network during establishment of the dynamic topological structure.

Step 407: The level of each node in the system is updated;

specifically, after the agent control node is marked, a control node increases its own level by 1. In case a super-ordinate control node accidentally logs off, if there exists a subordinate controlled node, a management instruction is sent to a subordinate node to decrease sequentially the level of a subordinate control node or controlled node according to the level of the control node itself.

And Step 408: The agent control node is registered with the network management server to complete the network loading process;

specifically, the agent control node establishes a controlled connection with the network management server to complete the network loading process.

Moreover, the controlled request in Step 401 may further include a restraint for timeout. The control node first makes a timeout judgment when receiving a multicast controlled request, and does not reply when the request has expired, so as to reduce data transmission in the network; in particular, the agent control node always returns a management and control reply when receiving a controlled request so as to prevent a node from starting an agent control application process. The purpose of adding the restraint for timeout is to sieve out a small portion of control nodes that communicate well with the current node. A timeout threshold may be determined as a relatively small time value, typically in the order of millisecond, according to an average communication delay of the network, or a communication status may be determined according to a real time network status. For example, a Time To Live (TTL) value of a data packet is set as a basis for judgment, timeout is determined and a control node discards the request when the TTL decreases by more than 5, wherein the TTL is the number of network segments a designated data packet is allowed to go through before the data packet is discarded by a Router.

Moreover, for a node that has once accessed the system, information of a control node of the last time should be preserved. At the time of re-access, it first tries accessing the same control node to accelerate the access and reduce data transmission in the network.

Figure 5:
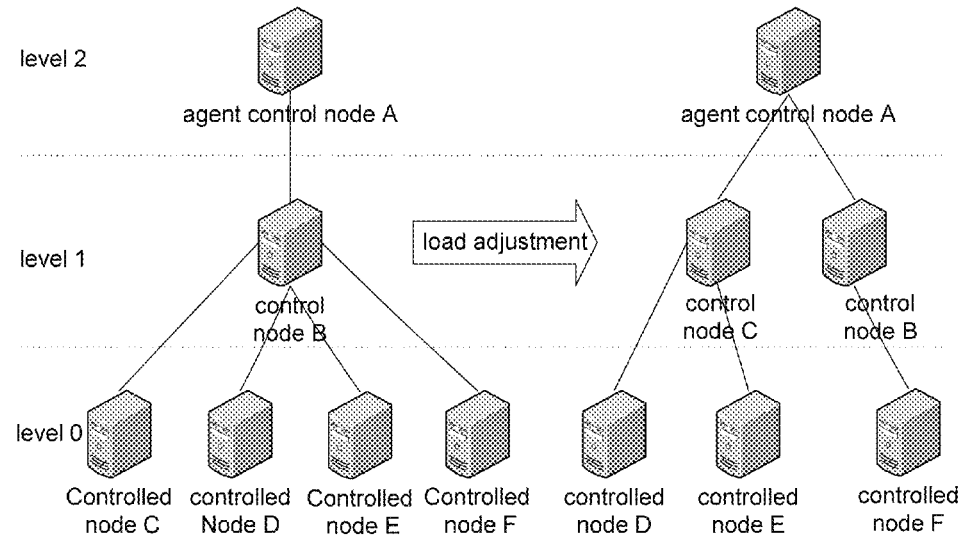
FIG. 5 is a diagram of a topological structure according to an embodiment of the disclosure, in which a load adjustment operation is implemented.

FIG. 5 is a diagram of a topological structure of an embodiment of the disclosure, in which a load adjustment operation is performed. As shown in FIG. 5, a certain control node may execute a load adjustment operation to transfer a management and control task to a less loaded node when it detects an overload per se, which is described as follows with reference to FIG. 5.

A $1^{st}$ level control node B selects from its subordinate nodes a least loaded 0 level controlled node C, promotes it to be a $1^{st}$ level control node, and transfers management and control power over a portion of the controlled nodes, for example, the management and control power over controlled nodes D and E, to C when the $1^{st}$ level control node B detects itself overloaded, for example, average a CPU occupancy rate exceeds 80%, disk input/output exceeds a preset threshold, and the like, wherein the specifications for overload may be selected according to the feature of the system application. Thus, the control node B transfers loads to the node C. The portion transferred may be flexibly set according to the feature and function of the network.

Specifically, the steps are as follows:

Step 501: the control node B sends a load adjustment request to the controlled node C;

specifically, the load adjustment request includes information related to a super-ordinate agent control node A and information related to the controlled nodes D and E that are to be transferred, wherein the information specifically includes: an IP address, performance data, level information, etc;

Step 502: the controlled node C processes the load adjustment request, breaks up a controlled connection with the control node B, establishes a controlled connection with the agent control node A, and updates a level per se;

Step 503: the new control node C sends a management and control transfer request to the controlled node D and E; and Step 504: the controlled nodes D and E break up controlled connections with the control node B and establish controlled connections with the control node C, respectively.

Since there exists no super-ordinate control node for an agent control node, the load adjustment operation is slightly different. The agent control node selects a nearest subordinate node to take over its original place to manage other controlled nodes, increases its own level by 1, and manages only the newly generated control node. The load adjustment operation will be initiated again to execute Steps 501 to 504 to perform load transfer when the new control node detects that its loads is also overly high.

Figure 6:
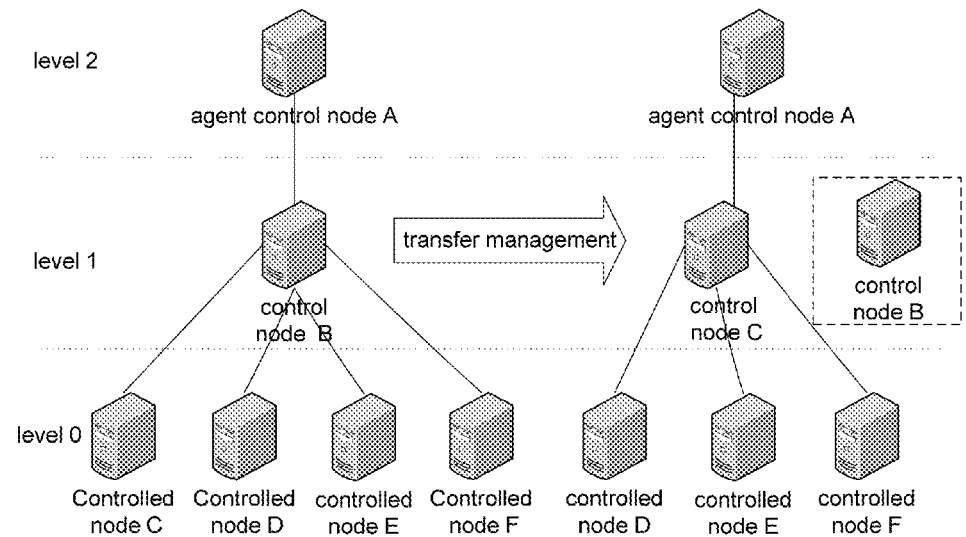
FIG. 6 is a diagram of a topological structure according to an embodiment of the disclosure, in which a nearest super-ordinate node transfers management when logging off.

FIG. 6 is a diagram of a topological structure according to an embodiment of the disclosure in which a super-ordinate node transfers management when logging off. As shown in FIG. 6, a control node may execute a control node logoff operation and select a less loaded subordinate node to take over its original place when the control node needs to log off for some reason, which is described as follows with reference to FIG. 6:

A $1^{st}$ level control node B activates a logoff process and selects from its subordinate nodes a least loaded 0 level controlled node C, promotes it to be a $1^{st}$ level control node, and transfers management and control power over all other controlled nodes, for example, the management and control power over controlled nodes D, E, and F, to the control node C. Thereby, the control node B is replaced by the control node C and can then log off.

Specifically, the steps are as follows:

Step 601: the control node B sends a load adjustment request to the controlled node C;

specifically, the load adjustment request includes information related to a super-ordinate control node A and information related to the controlled nodes D, E, and F that are to be transferred, wherein the information specifically includes: an IP address, performance data, level information, etc.;

Step 602: the controlled node C processes the load adjustment request, breaks up a controlled connection with the control node B, establishes a controlled connection with the agent control node A, and updates the level of itself;

Step 603: the control node C sends management and control transfer requests to the controlled nodes D, E, and F;

Step 604: the controlled nodes D, E, and F break up controlled connections with the control node B and establish controlled connections with the control node C, respectively; and Step 605: the control node B breaks up a controlled connection with the control node A to complete the logoff operation when detecting that all the controlled nodes D, E, and F are disconnected.

Figure 7:
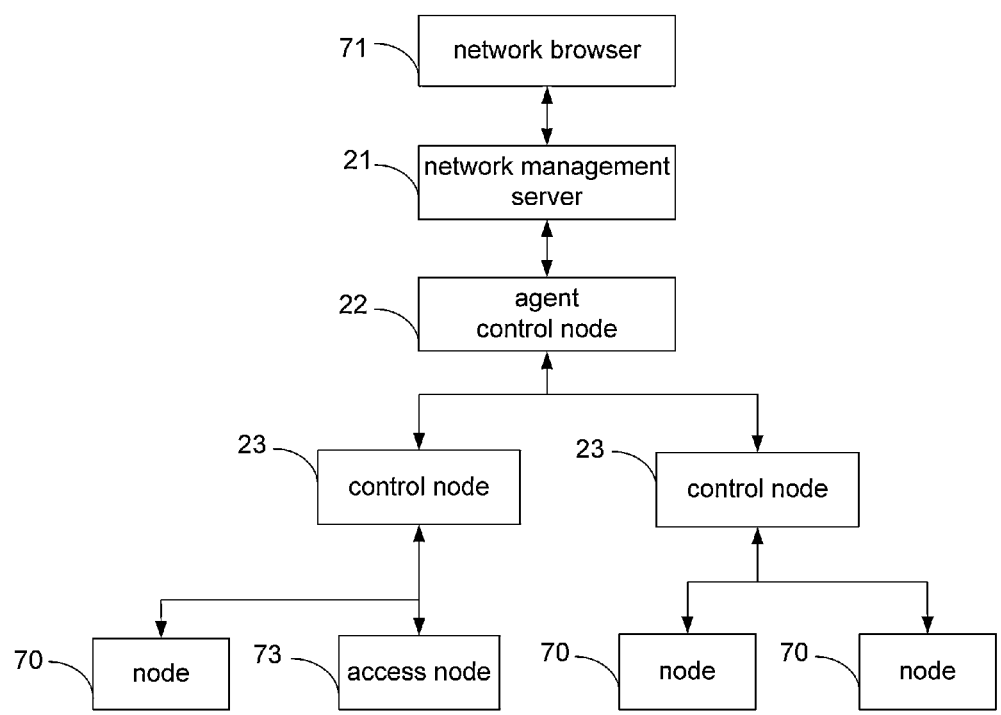
FIG. 7 is a diagram of a structure of a system for terminal access and management in cloud computing according to an embodiment of the disclosure.

FIG. 7 is a diagram of structure of a system for terminal access and management in cloud computing according to an embodiment of the disclosure. As shown In FIG. 7, the system includes a network browser 71, a network management server 21, and nodes 70, wherein the nodes 70 may further include several kinds of nodes: an access node 73, an agent control node 22, and a control node 23, wherein the network browser 71 is configured to visit the network management server 21 and manage and control the system via the network management server 21;

specifically, a manager may log on the network management system via the network browser 71 and manage and control the system via the network management server 21;

the network management server 21 is connected with the agent control node 22 and is configured to send a management and control instruction to the agent control node 22;

specifically, when circumstances allow, a warm backup network management server should be provided for the network management server to enhance reliability and maintainability. The warm backup network management server is not a necessary component of the system.

The access node 73 is a terminal with a management and control module, and is configured to search for a first responding control node 23 or agent control node 22 and connect with the network management server 21 via an agent control node connected to the found control node 23 or the found agent control node 22;

Specifically, the terminal with the management and control module refers to a terminal capable of implementing communication and processing an instruction and becomes an access node 73 in the system after accessing the network. In principle, there is no particular requirement on the topological structure when the terminal accesses the network. In view of security and network complexity reduction, it is preferable to construct the network by VPN technique, which though is not a necessary condition of the disclosure.

The searching for the first responding control node 23 or agent control node 22 and connecting with the network management server via the agent control node connected to the found control node 23 or the found agent control node 22 includes: the access node 73 first searches for the control node 23 or agent control node 22 via multicast of a controlled request, establishes a controlled connection with the first responding control node 23 or agent control node 22 when the control node 23 or agent control node 22 is found, updates level information, and connects with the network management server via the agent control node connected to the found control node 23 or the found agent control node 22; and an agent application is multicast when no control node 23 or agent control node 22 is found, wherein an access node 73 that multicasts the agent application first is marked as an agent control node 22, and level information is updated and the agent control node is registered with the network management server, and other nodes connect with the network management server via the agent control node 22, thus establishment of a dynamic topological structure is realized and the network loading process is completed.

The nodes 70 are provided with management and control modules, and are configured to collect running information and report the running information level by level, and are subjected to management operations performed by their respective nearest super-ordinate nodes.

Specifically, the reported running information includes one or more items in a group consisting of performance data of the nodes 70, loads of the nodes 70, equipment warning, and warning of an execution failure. After the establishment of the dynamic topological structure, a super-ordinate node can perform an active management operation on the structure of the system according to real time performance information; wherein the management operation includes: modifying the number of the controlled nodes managed by the super-ordinate node itself so as to transfer loads and achieve load balance; and transferring, by the super-ordinate node, management when the super-ordinate node logs off so as to selectively transfer management power to a subordinate node, thus ensuring system stability and efficiency of task processing. The modifying by a super-ordinate node the number of the controlled nodes managed by the super-ordinate node itself and performing a load adjustment operation specifically includes: a heavily loaded control node selects a least loaded controlled node, promotes it to be a control node, and transfers management and control power over a portion of the controlled nodes to the promoted node; the transferring management by a super-ordinate node specifically includes: a control node selects a least loaded controlled node, promotes it to be a control node, and transfers management and control power over all the controlled nodes to the promoted node.

Moreover, when the control node 23 or agent control node 22 accidentally fails, its subordinate node may act as an access node 73 and re-access the network and search for a first responding control node or agent control node to reestablish the topological structure, thus avoiding spread of the failure and increasing system reliability.

Moreover, for a node that has once accessed the system, information of the control node 23 of the last time should be preserved. At the time of re-access, it first tries accessing the same control node 23 to accelerate access and reduce data transmission in the network.

What described above are merely preferred embodiments of the disclosure and are not used to limit the scope of protection of the disclosure. Any modification, equivalent replacement, and improvement within the disclosure shall fall in the scope of protection of the disclosure.

The invention claimed is:

1. A method for terminal access and management in cloud computing, comprising:
    making a terminal with a management and control module access a bidirectional data transmission network and taking the terminal as a node;
    searching, by the node, for a first responding control node or agent control node, and connecting, by the node, with a network management server via an agent control node connected to the found control node or via the found agent control node; and
    collecting, by a management and control module of a node at each level, running information of the terminal, and reporting, by the management and control module of the node at each level, the running information level by level, and performing, by a nearest super-ordinate node, a management operation according to the reported running information;
    wherein the management operation comprises a transfer management operation; wherein the transfer management operation is that: a control node selects a least loaded controlled node, promotes the least loaded controlled node to be a control node, and transfers management and control power over all controlled nodes to the promoted node;
    wherein the agent control node, the control node and the controlled node are computing nodes;
    wherein a level of the agent control node is higher than a level of the control node and the level of the control node is higher than a level of the controlled node.

2. The method according to claim 1, further comprising: searching, by a nearest subordinate node, for the first responding control node or agent control node when the nearest super-ordinate node fails, before searching, by the node, for the first responding control node or agent control node.

3. The method according to claim 1, wherein the searching, by the node, for a first responding control node or agent control node and connecting with a network management server via an agent control node connected to the found control node or via the found agent control node comprises:
    searching, by each node, for a control node or agent control node via multicast of a controlled request, establishing, by the each node, a controlled connection with the first responding control node or agent control node when the control node or agent control node is found; then updating, by the each node, level information, and connecting, by the each node, with the network management server via an agent control node connected to the found control node or via the found agent control node; and
    multicasting an agent application when no control node or agent control node is found, marking a node that multicasts the agent application first as an agent control node, updating level information, registering the agent control node with the network management server, and connecting, by other nodes, with the network management server via the newly registered agent control node.

4. The method according to claim 1, wherein the running information comprises one or more items in a group consisting of performance data of the node, loads of the node, equipment warning, and warning of an execution failure.

5. A system for terminal access and management in cloud computing, comprising a network management server and nodes; wherein the nodes further comprise an access node, an agent control node, and a control node; wherein
the network management server is configured to send a management instruction to the agent control node;
the access node is provided with a management and control module, and is configured to access a bidirectional data transmission network, search for a first responding control node or agent control node, and connect with the network management server via an agent control node connected to the found control node or via the found agent control node; and
the nodes are provided with management and control modules, and are further configured to collect running information and report the running information level by level, and are subjected to management operations performed by their respective nearest super-ordinate nodes according to the reported running information;
wherein the management operations performed on the nodes by their respective nearest super-ordinate nodes comprise transfer management operations; wherein
the transfer management operations performed by the nearest super-ordinate nodes are that: a control node selects a least loaded controlled node, promotes the least loaded controlled node to be a control node, and transfers management and control power over all controlled nodes to the promoted node;
wherein the agent control node, the control node and the controlled node are computing nodes;
wherein a level of the agent control node is higher than a level of the control node and the level of the control node is higher than a level of the controlled node.

6. The system according to claim 5, wherein the nodes are further configured to search for the first responding control node or agent control node when their respective nearest super-ordinate nodes fail.

7. The system according to claim 5, wherein the access node searches for the first responding control node or agent control node and connects with the network management server via the agent control node connected to the found control node or via the found agent control node, which refers to that:
the access node searches for a control node or agent control node via multicast of a controlled request, establishes a controlled connection with the first responding control node or agent control node when the control node or agent control node is found, updates level information, and connects with the network management server via the agent control node connected to the found control node or via the found agent control node; and
an agent application is multicast when no control node or agent control node is found, a node that multicasts the agent application first is marked as an agent control node, level information is updated, the agent control node is registered with the network management server, and other nodes are connected with the network management server via the newly registered agent control node.

8. The system according to claim 5, wherein the running information reported by the nodes comprises one or more items in a group consisting of performance data of the nodes, loads of the nodes, equipment warning, and warning of an execution failure.

* * * * *